United States Patent [19]

Asai et al.

[11] Patent Number: 5,163,315
[45] Date of Patent: Nov. 17, 1992

[54] LEAK DETECTING METHOD FOR VESSELS

[75] Inventors: Kazuhiro Asai, Miyagi; Shigeru Morimoto; Hiroshi Omori, both of Osaka; Koji Ishihara, Tokyo, all of Japan

[73] Assignees: Daikin Industries, Ltd., Osaka; NKK Corporation, Tokyo, both of Japan

[21] Appl. No.: 722,018

[22] Filed: Jun. 27, 1991

[30] Foreign Application Priority Data

Jul. 10, 1990 [JP] Japan .................................. 2-180628

[51] Int. Cl.$^5$ .......................................... G01M 3/20
[52] U.S. Cl. ..................................... 73/40.7; 73/49.3
[58] Field of Search ..................... 73/40.7, 49.3, 45.4, 73/52, 49.2; 250/343

[56] References Cited
FOREIGN PATENT DOCUMENTS

| 6134 | 1/1987 | Japan | 73/40.7 |
| 765680 | 9/1980 | U.S.S.R. | 73/40.7 |
| 868389 | 9/1981 | U.S.S.R. | 73/49.3 |
| 1281947 | 1/1987 | U.S.S.R. | 73/40.7 |

Primary Examiner—Hezron E. Williams
Assistant Examiner—Joseph W. Roskos
Attorney, Agent, or Firm—Ladas & Parry

[57] ABSTRACT

A leak detecting method for vessels in which a gas of a given pressure is mixed with sulfur hexafluoride of a given partial pressure and the mixture is introduced into a vessel, and a gas in the vicinity of an outer peripheral surface of the vessel is sucked by a gas sucking mechanism.

According to one form of the invention, the sucked air is introduced into an absorption cell and a P(16)-line laser light of a carbon dioxide gas laser is introduced into the absorption cell. Then, the presence or absence of absorption of the P(16)-line laser light within the absorption cell is detected in accordance with a change in the transmitted light intensity of the P(16)-line laser light and the presence or absence of a leak in the pressure vessel is discriminated in accordance with a result of the detection. In accordance with another form of the invention the sucked air is introduced into a multiple reflection absorption cell and a P(16)-line laser light of a carbon dioxide gas laser and a reference light slightly different in wavelength from the P(16)-line laser light are introduced into the multiple reflection absorption cell. Then, the presence or absence of absorption of the P(16)-line laser light within the multiple reflection absorption cell is detected in accordance with a change in a light intensity ratio between the reflected lights of the P(16)-line laser light and the reference light, and the presence or absence of a leak in the pressure vessel is discriminated in accordance with a result of the detection.

2 Claims, 3 Drawing Sheets

LEAK DETECTING METHOD FOR VESSELS

BACKGROUND OF THE INVENTION

1. Field of the Invention

The present invention relates to a leak detecting method for vessels such as pressure vessels and hermetically sealed vessels and more particularly to a leak detecting method for vessels which employs sulfur hexafluoride as a tracer gas to utilize the absorption of a carbon dioxide gas P(16)-line laser light by the tracer gas.

2. Description of the Prior Art

Included among conventional leak detecting methods for vessels represented for example by pressure vessels and hermetically sealed vessels is a method so designed that as for example, a Freon gas is sealed into a vessel and a halogen detector is used to detect any leakage from the vessel.

There is known another method so designed that the whole vessel is placed within a high vacuum vessel and a helium gas is sealed into the vessel, thereby detecting any leakage from the vessel by use of a helium detector.

With the conventional leak detecting methods for vessels, the former prior art or the method of using a Freon gas has the disadvantage of destroying the terrestrial environment, and thus its use will be limited or inhibited in the future.

Also, the method of using a helium gas is disadvantageous in that since the vessel is placed within the high vacuum vessel, a test equipment is considerably increased in size and moreover it is difficult to reduce the locations of any leaks.

SUMMARY OF THE INVENTION

The present invention has been made to overcome the foregoing deficiencies in the prior art and it is an object of the invention to provide a leak detecting method for vessels which is so designed that the location of any leakage can be presumed without using any Freon gas and also no high vacuum vessel is required.

To accomplish the above object, in accordance with one aspect of the present invention there is provided a leak detecting method for vessels which comprises mixing a gas of a given pressure with sulfur hexafluoride of a given partial pressure and introducing the mixture into a vessel, sucking the gas in the vicinity of the outer peripheral surface of the vessel by a gas sucking mechanism to introduce the sucked gas into an absorption cell, introducing the P(16)-line laser light of a carbon dioxide gas laser into the absorption cell, detecting the presence of absorption of the P(16)-line laser light within the absorption cell in accordance with a change in the amount of light transmitted through the absorption cell, and discriminating the presence of any leakage from the vessel in accordance with the result of the detection.

In accordance with another aspect of the present invention there is provided for the purpose of accomplishing the above object a leak detecting method for vessels which comprises mixing a gas of a given pressure with sulfur hexafluoride of a given partial pressure and introducing the same into a vessel, sucking the gas in the vicinity of the outer peripheral surface of the vessel by a gas sucking mechanism to introduce the sucked gas into a multiple reflection absorption cell, introducing the P(16)-line laser light of a carbon dioxide gas laser and a reference light which is slightly different in wavelength from the P(16)-line laser light into the multiple reflection absorption cell, detecting the presence of absorption of the P(16)-line laser light within the multiple reflection absorption cell in accordance with a change in the ratio between the light intensities of the both reflected lights of the introduced lights, and discriminating the presence of leakage of the vessel in accordance with the result of the detection.

BREIF DESCRIPTION OF THE DRAWINGS

FIG. 1 is a block diagram showing the construction of a leak detecting apparatus for pressure vessels according to an embodiment of the present invention.

FIG. 2(*a*), 2(*b*) and 2(*c*) are diagrams showing examples of the measurement of a P(16)-line laser light by the absorption cell of FIG. 1.

FIG. 3 is a schematic block diagram showing the construction of a leak detecting apparatus for pressure vessels according to another embodiment of the present invention.

DESCRIPTION OF THE PREFERRED EMBODIMENTS

Figure 1:
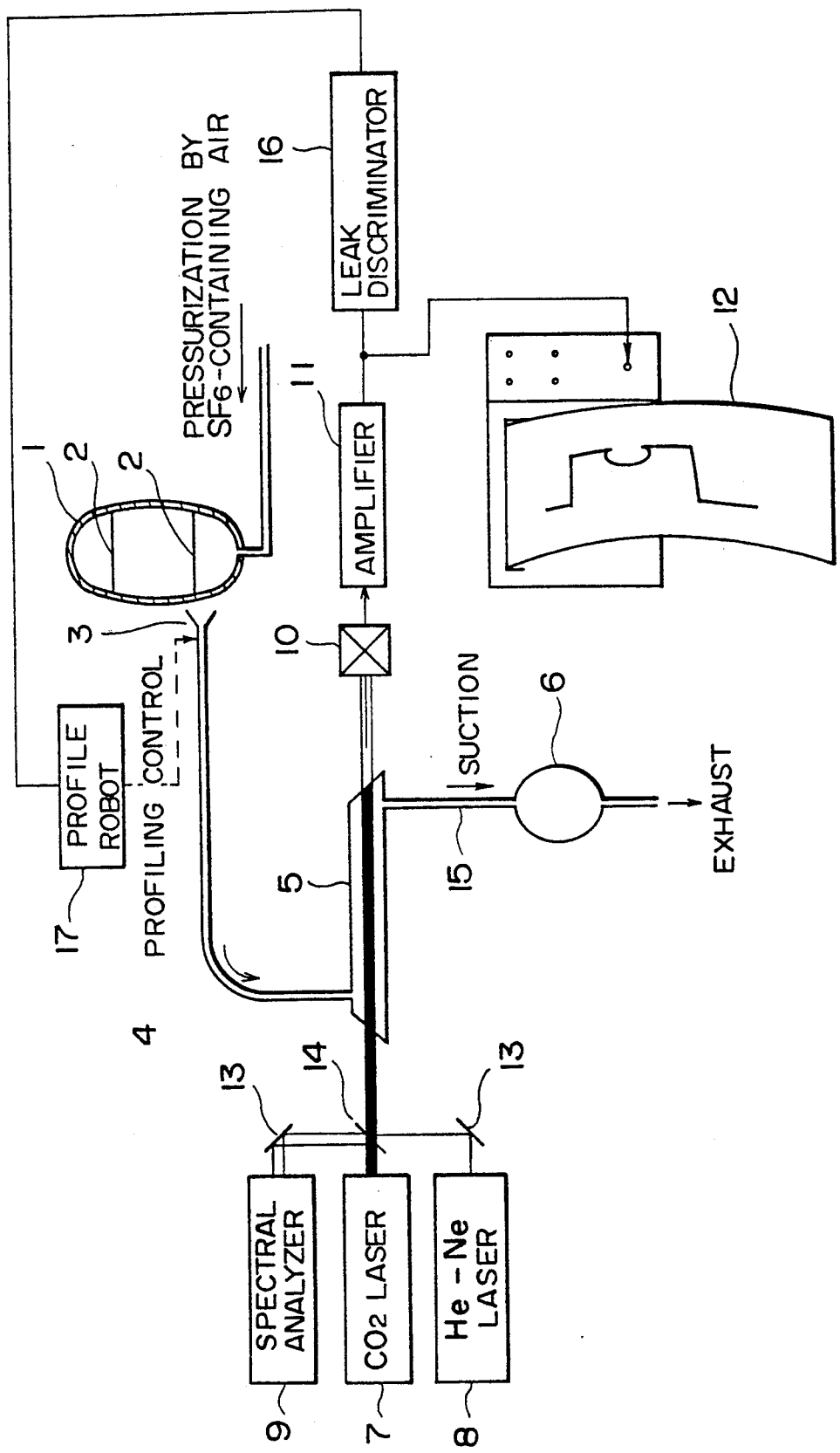

FIG. 1 is a schematic block diagram showing the construction of a leak detecting apparatus for pressure vessels according to an embodiment of the present invention. In the Figure, numeral 1 disignates a pressure vessel and the interior of which is pressurized by an externally supplied air mixed with sulfur hexafluoride (hereinafter referred to as $SF_6$). Numeral 2 designates the welds of the pressure vessel 1 where the tendency to cause leakage is highest. Numeral 3 designates an air suction port which is formed for example into a funnel shape and including a lower part having a flexible skirt so as to be convenient for the sucking of air while being moved and an upper part connected to one end of a flexible pipe 4 for air exhausting purposes. The position of the air suction port 3 is subjected to profiling control by a profile robot 17 which is preliminarily taught about the positions of the welds 2. The other end of the flexible pipe 4 is connected to the air inlet of an absorption cell 5.

The absorption cell 5 is a closed container having ends made of a substance transparent to light of wavelengths in the infrared region and a given cell length (e.g., 30 cm) and including an air inlet and an air outlet.

In this embodiment, the air inlet of the absorption cell 5 is connected to the suction port 3 through the flexible pipe 4 and its air outlet is connected to a suction and exhaust unit 6 through a pipe 15. As a result, air is continuously flowing at a constant flow rate within the absorption cell 5 so that if the air suction port 3 is positioned at the location of a leak, the $SF_6$-containing air is introduced into the absorption cell 5. In order to detect the $SF_6$-containing air, a P(16)-line laser light is introduced from a carbon dioxide gas laser into the absorption cell 5. Numeral 7 designates the carbon dioxide gas (hereinafter referred to as $CO_2$) laser for emitting a laser light having a wavelength of 10.6 μm (hereinafter referred to as a P(16)-line laser light). Numeral 8 designates a helium neon (hereinafter referred to as He-Ne) laser which emites a red light and is used as an identification laser for checking the optical path of the $CO_2$ laser. Numeral 9 designates a spectral analyzer which is a measuring device for measuring the wavelength of the light emitted by the $CO_2$ laser 7. Numeral 10 designates a light sensor for detecting light near a wavelength of 10.6 μm to convert and generate it as an electric signal.

Numeral 11 designates an amplifier for amplifying the input signal from the light sensor 10 and applying it to an indicator 12 and a leak discriminator 16. Numeral 12 designates the indicator for indicating the output of the amplifier 11, 13 a mirror for light reflecting purposes, 14 a half-mirror for reflecting part of the incident light and transmitting part of the incident light, 15 the pipe connecting the air outlet of the absorption cell and the suction and exhaust unit, 16 the leak discriminator for discriminating a leak in accordance with a change in the output signal of the amplifier 11, and 17 the profile robot for profile controlling the position of the suction port 3.

Figure 2:
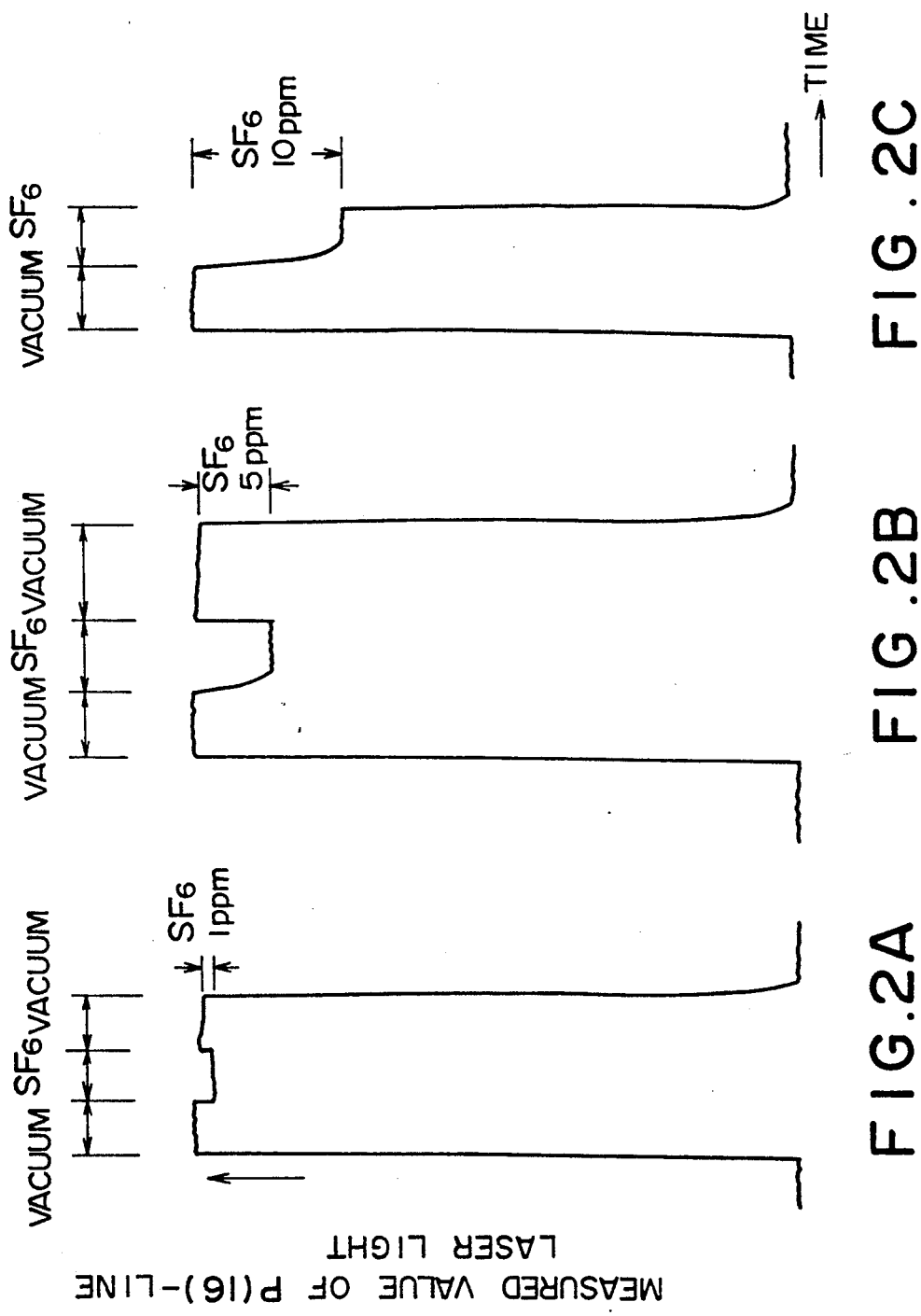

FIGS. 2(a), 2(b) and 2(c) are diagrams showing examples of the measurement of the P(16)-line laser light in the absorption cell of FIG. 1 and each of the examples shows the measured values of the transmitted light intensity of the incident P(16)-line laser light into the absorption cell in cases where a vacuum is produced within the absorption cell and where a mixed gas of $SF_6$ having a concentration of 1 ppm, 5 ppm or 10 ppm and nitrogen ($N_2$) is sealded, respectively.

The operation of the ebodiment of FIG. 1 will now be described with reference to FIGS. 2(a), 2(b), and 2(c). In order to detect leakage from the pressure vessel 1, the interior of pressure vessel 1 is pressurized by air mixed with $SF_6$ having a concentration of about 5 ppm to 10 ppm. Since the welds 2 and the terminal mouting portion of the vessel generally represent those portions having the highest tendency to cause a leak, the profile robot 17 is preliminarily taught about the shape of the pressure vessel 1 and the positions of the welds 2. The profile robot 17 controls the position of the suction port 3 connected to the flexible pipe 4 in such a manner that the suction port 3 is profile controlled along the outer peripheral portion of the pressure vessel 1 so as to scan all of the areas to be inspected such as the welds 2, thereby sucking the air in the vicinity of these areas successively. In this case, the suction port 3 in not brought into close contact with the outer peripheral surface of the pressure vessel 1 but a small gap is maintained therebetween so that the air near the suction port 3 is also sucked and thus the air of a small flow rate (e.g., several ACC/sec) flows continuously. In order that this air of the constant flow rate flows at all times, the suction and exhaust unit 6 continuously effects the suction and exhaustion of the air through the suction port 3, the flexible pipe 4, the absorption cell 5 and the pipe 15. In this way, the air of the constant flow rate is continuously introduced into the absorption cell 5 from near the suction port 3 so that if the suction port 3 is positioned on the location of a leak such as the weld 2 or the terminal mounting portion, the $SF_6$-containing air is introduced into the absorption cell 5 and the air remains temporarily within the cell. The $CO_2$ laser 7 is preliminarily tuned by use of the spectral analyzer 9 and it outputs the P(16)-line laser light (i.e., the laser light having a wavelength of 10.6 $\mu$m). Also, the output optical path of the $CO_2$ laser light is preliminarily adjusted by use of the output light (red light) of the identifying He-Ne laser 8 so as to pass along the central axis of the absorption cell 5. The ends of the absorption cell 5 are made of a substance which is transparent to light of wavelengths in the infrared region so that the $CO_2$ laser light having a wavelenght of 10.6 $\mu$m is introduced into one end of the absorption cell 5 and its transmitted light is taken out from the other end. Then, depending on whether the $SF_6$ is present within the absorption cell 5 when the P(16)-line laser light from the $CO_2$ laser passes through the optical path of absorption cell 5, there is caused a variation in the amount of the transmitted laser light. The laser light transmitted through the absorption cell 5 is first converted to an electric signal by the light sensor 10 and it is then amplified by the amplifier 11, thereby generating an output. The output of the amplifier 11 is indicated on the indicator 12 and it is also supplied to the leak discriminator 16 which in turn discriminates the presence of leakage from the pressure vessel 1. The output of the leak discriminator 16 is fed back to the robot 17 so that while referring to the results of the leak discriminating signals supplied from the leak discriminator 16, the robot 17 controls the position of the suction port 3 in a manner that the positions of leaks and the shape of leakage on the pressure vessel 1 are measured properly.

Each of FIGS. 2(a), 2(b), and 2(c) shows variations in the amount of transmitted light due to the absorption of the incident $CO_2$ laser light of 10.6 $\mu$m in wavelength in cases where a vacuum is produced within the absorption cell 5 and where $N_2$ is mixed with a trace amount (1 ppm, 5 ppm or 10 ppm) of $SF_6$. Thus, the leak discriminator 16 can discriminate the presence of leakage of the pressure vessel 1 by discriminating the amount of such variation.

Figure 3:
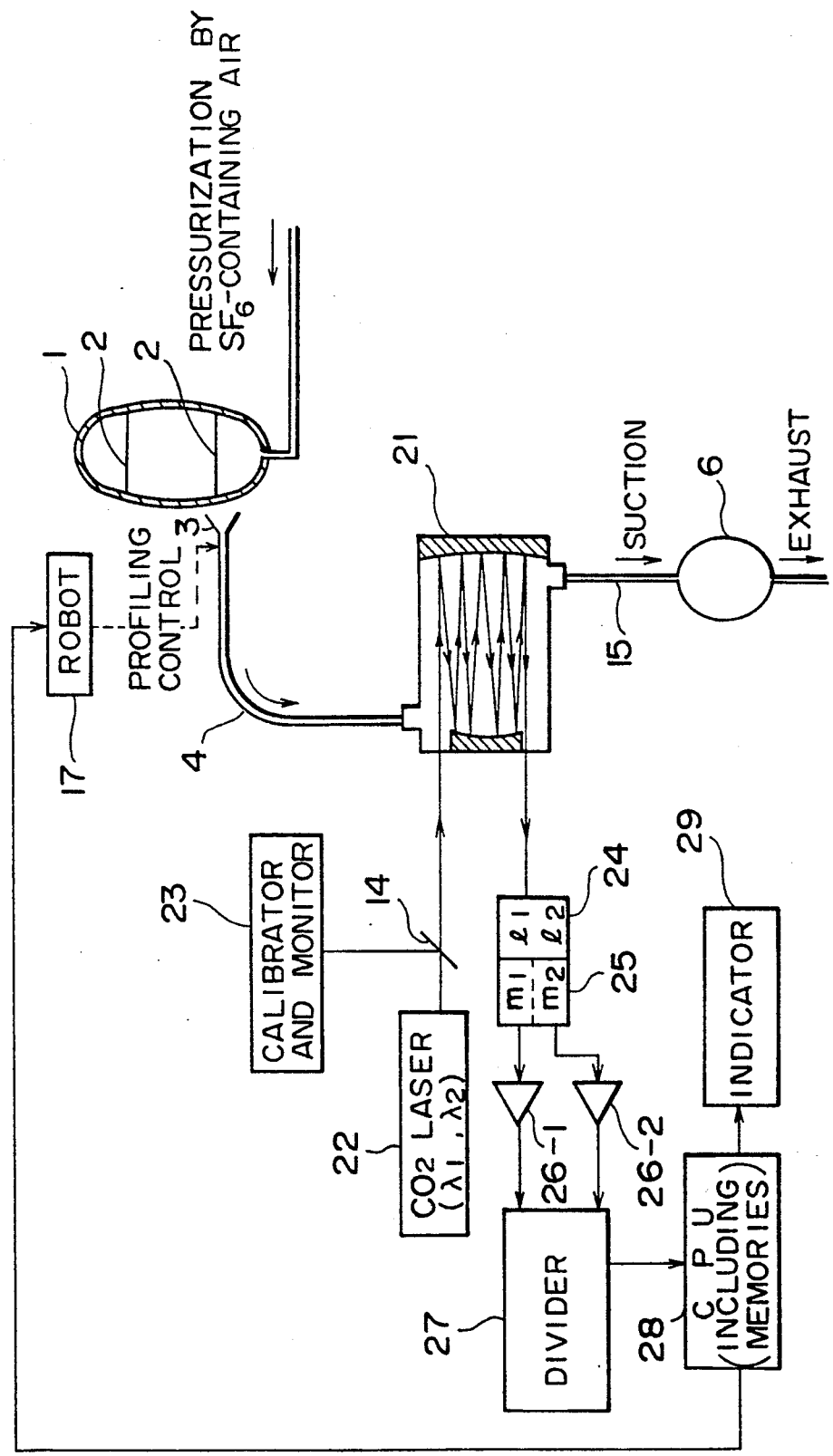

Referring now to FIG. 3, there is illustrated a schematic block diagram showing the construction of a leak detecting apparatur for pressure vessels according to another embodiment of the present invention. In the Figure, numerals 1, 2, 3, 4, 6, 14, 15 and 17 designate the same component parts as shown in FIG. 1. Numeral 21 designates a multiple reflection absorption cell, and the cell 21 is a closed container having an incident light entrance and a reflected light outlet which are made of a substance transparent to light of wavelengths in the infrared region and it also includes an air inlet and an air outlet. The incident light introduced through the incident light entrance of the mulitple reflection absorption cell 21 is subjected to multiple reflection (that is, the optical path length is extended in an amount corresponding to the multiple reflection) within the cell by oppositely arranged infrared reflection concave mirrors within the cell and the reflected light is delivered to the outside through the reflected light outlet. In this embodiment, the multiple reflection absorption cell 21 is a sensor so that if $SF_6$ is mixed with the air sucked into the cell 21, only the incident laser light of 10.6 $\mu$m in wavelength is absorbed in the course of the multiple reflection within the cell and thus its output is delivered as an attenuated light intensity through the reflected light outlet. Numeral 22 designates a $CO_2$ laser which outputs two laser beam of different wavelengths, i.e., a P(16)-line laser light of a wavelenght $\lambda_1$ which is 10.6 $\mu$m and a reference light of a wavelength $\lambda_2$ which is slightly different from the wavelength $\lambda_1$. It is to be noted that the reference light of the wavelength $\lambda_2$ may comprise for example a P(18)-line laser light of a wavelength of $\lambda_2$ which is 10.6 $\mu$m.

Numeral 23 designates a calibrator and monitor for calibrating and monitoring the $CO_2$ laser 22 so that two measuring lightwaves slightly different in wavelength (or frequency) from each other are generated from the $CO_2$ laser 22, and this measuring device is used for effecting the initial calibration of the two light waves of the wavelengths $\lambda_1$ and $\lambda_2$ which are generated from the $CO_2$ laser 22 and monitored during its operation. Numeral 24 designates an optical filter for the lights outputted from the multiple reflection absorption cell 21 and it is composed a filter $l_1$ for transmitting only the light of the wavelength $\lambda_1$ and a filter $l_2$ for transmitting only the light of the wavelength $\lambda_2$. Numeral 25 designates a light sensor comprising light detectors $m_1$ and $m_2$ for detecting the lights of the wavelengths $\lambda_1$ and $\lambda_2$ transmitted by the filters $l_1$ and $l_2$, respectively. Numerals 26-1 and 26-2 designates #1 amplifier and #2 amplifier for respectively amplifying and outputting the input signals from the light detectors $m_1$ and $m_2$ respectively. Numeral 27 designates a divider for dividing the output value of the #1 amplifier 26-1 by the output value of the #2 amplifier 26-2 in order to calculate the ratio of light intensities of the wavelengths $\lambda_1$ and $\lambda_2$ as the quotient of the division. Numeral 28 designates a microprocessor (hereinafter referred to as a CPU) incorporating memories, i.e., ROM and RAM for storing programs and measured data, etc. Numeral 29 designates an indicator for indicating the measurement results.

The operation of the embodiment of FIG. 3 will be described. The operation of pressurizing the interior of pressure vessel 1 with the air mixed with a trace amount of $SF_6$, controlling the position of the air suction port 3 connected to the flexible pipe 4 by the profile robot 17 and sucking the nearby air while profile controlling the suction port 3 along the outer peripheral surface (mainly the welds 2, etc.,) of the pressure vessel 1 for the purpose of detecting leakage from the pressure vessel 1 is all the same as in the case of FIG. 1. In the case of FIG. 3, however, the other end of the flexible pipe 4 is connected to the air inlet of the multiple reflection absorption cell 21 and one end of the pipe 15 is connected to the air outlet of the multiple reflection absorption cell 21. As a result, the suction and exhaust unit performs the continuous suction and exhaustion through the suction port 3, the flexible pipe 4, the multiple reflection absorption cell 21 and the pipe 15. As in the case of FIG. 1, if the suction port 3 sucks the $SF_6$-containing air at the location of a leak, this $SF_6$-containing air is introduced into the multiple reflection absorption cell 21 and it remains temporarily within the cell. After its two output wavelengths have been preliminarily calibrated by the calibrator and monitor 23, the $CO_2$ laser 22 introduces both the P(16)-line laser light of the wavelength $\lambda_1$ ($=10.6$ $\mu m$) and the reference light of the wavelength $\lambda_2$ which is slightly different from the former into the multiple reflection absorption cell 21 through its light entrance. When the $SF_6$-containing air is present within the multiple reflection absorption cell 21, the P(16)-line laser light of the wavelength $\lambda_1$ of the incident laser beams of the different wavelengths is absorbed in the course of multiple reflection and the reference light of the wavelength $\lambda_2$ is practically not absorbed and they are delivered as such from the reflected light outlet. Therefore, while there is caused a variation in the light intensity of the P(16)-line laser light of the wavelength $\lambda_1$ delivered from the reflected light outlet depending on whether $SF_6$ is present within the multiple reflection absorption cell 21, practically there is no change in the light intensity of the reference light of the wavelength $\lambda_2$. The P(16)-line laser light of the wavelength $\lambda_1$, which is delivered from the reflected light output of the multiple reflection absorption cell 21, is supplied to one input of the divider 27 through the filter $l_1$ of the filter 24, the light detector $m_1$ of the light sensor 25 and the #1 amplifier 26-1 and similarly the reference light of the wavelength $\lambda_2$ is supplied to the other input of the divider 27 through the filter $l_2$ of the filter 24, the light detector $m_2$ of the light sensor 25 and the #2 amplifier 26-2. The divider 27 divides the output value of the #1 amplifier 26-1 by the output value of the #2 amplifier 26-2 to calculate the ratio between the two light intensities. The thus calculated light intensity ratio data of the P(16)-line laser light of the wavelength $\lambda_1$ to the reference light of the wavelength $\lambda_2$ is supplied to the CPU 28. In response to the input data, the CPU 28 detects the presence or absence of the absorption of the P(16)-line laser light so that the result of the detection is indicated on the indicator 29 and also the presence or absence of leakage of the pressure vessel 1 is discriminated in accordance with the detection result, thereby feeding the result of the discrimination back to the robot 17. Referring to the feed back signal, the robot 17 controls the position of the suction port 3 in such a manner that the positions of leaks and the shape of leakage on the pressure vessel 1 are measured properly.

While, in above-described preferred embodiments, the present invention has been shown as applied to the detection of leaks in pressure vessels, the present invention is applicable not only to the pressure testing of pressure vessels but also to the gas-tight testing of hermetically sealed vessels and moreover the invention is not particularly limited thereto.

In accordance with the present invention, air, inert gases, nitrogen gas, etc., are conceivable as the suitable gases for introduction into such vessels but the present invention is not particularly limited thereto.

We claim:

1. A leak detecting method for vessels comprising the steps of:
    mixing a gas of a given pressure with sulfur hexafluoride of a given partial pressure and introducing the same into a vessel;
    sucking a gas in the vicinity of an outer peripheral surface of said vessel by gas sucking means to introduce the same into an absorption cell;
    introducing a P(16)-line laser light of a carbon dioxide gas laser into said absorption cell;
    detecting the presence or absence of absorption of said P(16)-line laser light within said absorption cell in accordance with a change in a transmitted light intensity of said P(16)-line laser light; and
    discriminating the presence or absence of a leak in said vessel in accordance with a result of said detection.

2. A leak detecting method for vessels comprising the steps of:
    mixing a gas of a given pressure with sulfur hexafluoride of a given partial pressure and introducing the same into a vessel;
    sucking a gas in the vicinity of an outer peripheral surface of said vessel by gas sucking means to introduce the same into a multiple reflection absorption cell;
    introducing a P(16)-line laser light of a carbon dioxide gas laser and a reference light which is slightly different in wavelength from said P(16)-line laser light into said multiple reflection absorption cell;
    detecting the presence or absence of absorption of said (P-16)-line laser light within said multiple reflection absorption cell in accordance with a change in a light intensity ratio between reflected lights of said P(16)-line laser light and said reference light; and
    discriminating the presence or absence of a leak in said vessel in accordance with a result of said detection.

* * * * *